(12) United States Patent
Endo et al.

(10) Patent No.: US 10,968,848 B2
(45) Date of Patent: Apr. 6, 2021

(54) EGR DEVICE

(71) Applicant: SUBARU CORPORATION, Tokyo (JP)

(72) Inventors: Keigo Endo, Tokyo (JP); Takashi Asai, Tokyo (JP); Tomoyuki Urayama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/743,132

(22) Filed: Jan. 15, 2020

(65) Prior Publication Data

US 2020/0300188 A1    Sep. 24, 2020

(30) Foreign Application Priority Data

Mar. 22, 2019  (JP) .............................. JP2019-054777

(51) Int. Cl.
| | | |
|---|---|---|
| *F02B 47/08* | (2006.01) | |
| *F02D 41/00* | (2006.01) | |
| *F02M 26/54* | (2016.01) | |
| *F02M 26/23* | (2016.01) | |
| *F02M 26/50* | (2016.01) | |

(52) U.S. Cl.
CPC ....... *F02D 41/0077* (2013.01); *F02D 41/005* (2013.01); *F02D 41/0072* (2013.01); *F02M 26/54* (2016.02); *F02M 26/23* (2016.02); *F02M 26/50* (2016.02)

(58) Field of Classification Search
CPC ........ F02M 26/00; F02M 26/05; F02M 26/06; F02M 26/07; F02M 26/54; F02D 41/005

USPC .......................... 123/568.1, 568.21; 701/108
See application file for complete search history.

(56) References Cited

U.S. PATENT DOCUMENTS

| | | | | |
|---|---|---|---|---|
| 5,137,004 | A * | 8/1992 | Takahata ................. | F02M 26/57 73/114.36 |
| 2007/0209609 | A1 * | 9/2007 | Shimada ............. | F02D 19/0692 123/3 |
| 2010/0235070 | A1 * | 9/2010 | Amano .................. | B60K 6/365 701/103 |
| 2014/0020665 | A1 | 1/2014 | Yoshioka | |

(Continued)

FOREIGN PATENT DOCUMENTS

| | | |
|---|---|---|
| JP | 8-326608 A | 12/1996 |
| JP | 2014-20247 A | 2/2014 |

*Primary Examiner* — John Kwon
(74) *Attorney, Agent, or Firm* — Troutman Pepper Hamilton Sanders LLP

(57) ABSTRACT

An EGR device includes an EGR flow path, an EGR valve, a stepping motor, a motor driver, a return spring, a speed detector, and an opening degree estimator. The EGR flow path conveys exhaust gas from an exhaust flow path of an engine to an intake flow path. The EGR valve is disposed on the EGR flow path. The stepping motor drives the EGR valve to open to close. The motor driver supplies driving power to the stepping motor. The return spring urges the EGR valve in a valve closing direction. The speed detector detects an output shaft rotation speed of the engine. The opening degree estimator estimates an opening degree of the EGR valve. The motor driver changes a drive frequency of the stepping motor according to variations of the output shaft rotation speed detected by the speed detector and the opening degree estimated by the opening degree estimator.

9 Claims, 5 Drawing Sheets

(56) References Cited

U.S. PATENT DOCUMENTS

2019/0017423 A1\* 1/2019 Martin .................... F01N 9/002
2020/0300188 A1\* 9/2020 Endo ....................... F02D 41/20

\* cited by examiner

EGR DEVICE

CROSS-REFERENCE TO RELATED APPLICATIONS

The present application claims priority from Japanese Patent Application No. 2019-054777 filed on Mar. 22, 2019, the entire contents of which are hereby incorporated by reference.

BACKGROUND

The disclosure relates to an EGR device that recirculates exhaust gas of an engine to an intake side.

It is known that in an engine mounted in an automobile and the like, exhaust gas recirculation (EGR) that refluxes exhaust gas to an intake side is performed in order to control a combustion state and suppress pumping loss.

In an EGR device that performs EGR described above, a flow rate of recirculated exhaust gas (EGR amount) is controlled so that an actual EGR rate approaches a target EGR rate by, for example, an EGR valve whose opening degree is controlled by using an actuator such as a stepping motor.

As a conventional technique related to driving control of an EGR valve using a stepping motor, for example, Japanese Unexamined Patent Application Publication No. 2014-20247 describes a technique where a pressure difference between a front side pressure and a rear side pressure of the EGR valve is obtained as a front-rear differential pressure, and when the front-rear differential pressure is greater than a predetermined reference value, the stepping motor is energized and controlled with a drive frequency lower than a normal drive frequency during a period from a valve fully closed state to a valve initial opening state.

Japanese Unexamined Patent Application Publication No. 8-326608 describes that the smaller the differential pressure between an upstream side and a downstream side of the EGR valve is, the higher the drive frequency of the stepping motor is set in order to improve responsiveness of driving control.

SUMMARY

An aspect of the disclosure provides an exhaust gas recirculation (EGR) device. The EGR device includes an EGR flow path, an EGR valve, a stepping motor, a motor driver, a return spring, a speed detector, and an opening degree estimator. The EGR flow path conveys exhaust gas from an exhaust flow path of an engine to an intake flow path. The EGR valve is disposed on the EGR flow path. The stepping motor drives the EGR valve to open and close. The motor driver supplies driving power to the stepping motor. The return spring urges the EGR valve in a valve closing direction. The speed detector detects an output shaft rotation speed of the engine. The opening degree estimator estimates an opening degree of the EGR valve. The motor driver changes a drive frequency of the stepping motor according to variations of the output shaft rotation speed detected by the speed detector and the opening degree estimated by the opening degree estimator.

An aspect of the disclosure provides an exhaust gas recirculation (EGR) device. The EGR device includes an EGR flow path, an EGR valve, a stepping motor, a motor driver, a return spring, and circuitry. The EGR flow path conveys exhaust gas from an exhaust flow path of an engine to an intake flow path. The EGR valve is disposed on the EGR flow path. The stepping motor drives the EGR valve to open and close. The motor driver supplies driving power to the stepping motor. The return spring urges the EGR valve in a valve closing direction. The circuitry detects an output shaft rotation speed of the engine. The circuitry estimates an opening degree of the EGR valve. The motor driver changes a drive frequency of the stepping motor according to variations of the detected output shaft rotation speed and the estimated opening degree.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. It is known that in an EGR valve driven by a stepping motor, as described above, in a case where a large torque is used when the EGR valve is initially opened or a front-rear differential pressure of the EGR valve is large, responsiveness of EGR control is secured by securing torque by decreasing drive frequency of the stepping motor, or otherwise by improving a driving speed of the EGR valve by increasing the drive frequency.

However, inventors of the present disclosure have found that when a frequency of exhaust pulsation which acts on the EGR valve as an excitation force or a vibration frequency (resonance frequency) of a movable portion of the EGR valve is coincident with or close to the drive frequency of the stepping motor, synchronization with input pulses is lost in the stepping motor, and it may cause a step-out where an actual position of a rotor deviates from a drive instruction value and the rotor is stabilized there.

It is desirable to provide an EGR device where a driving speed of the EGR valve is increased while preventing a step-out of the stepping motor.

The EGR device of the embodiment is provided to, for example, a horizontally opposed four-cylinder gasoline direct injection engine mounted in an automobile such as a passenger car as a power source for traveling.

Figure 1:
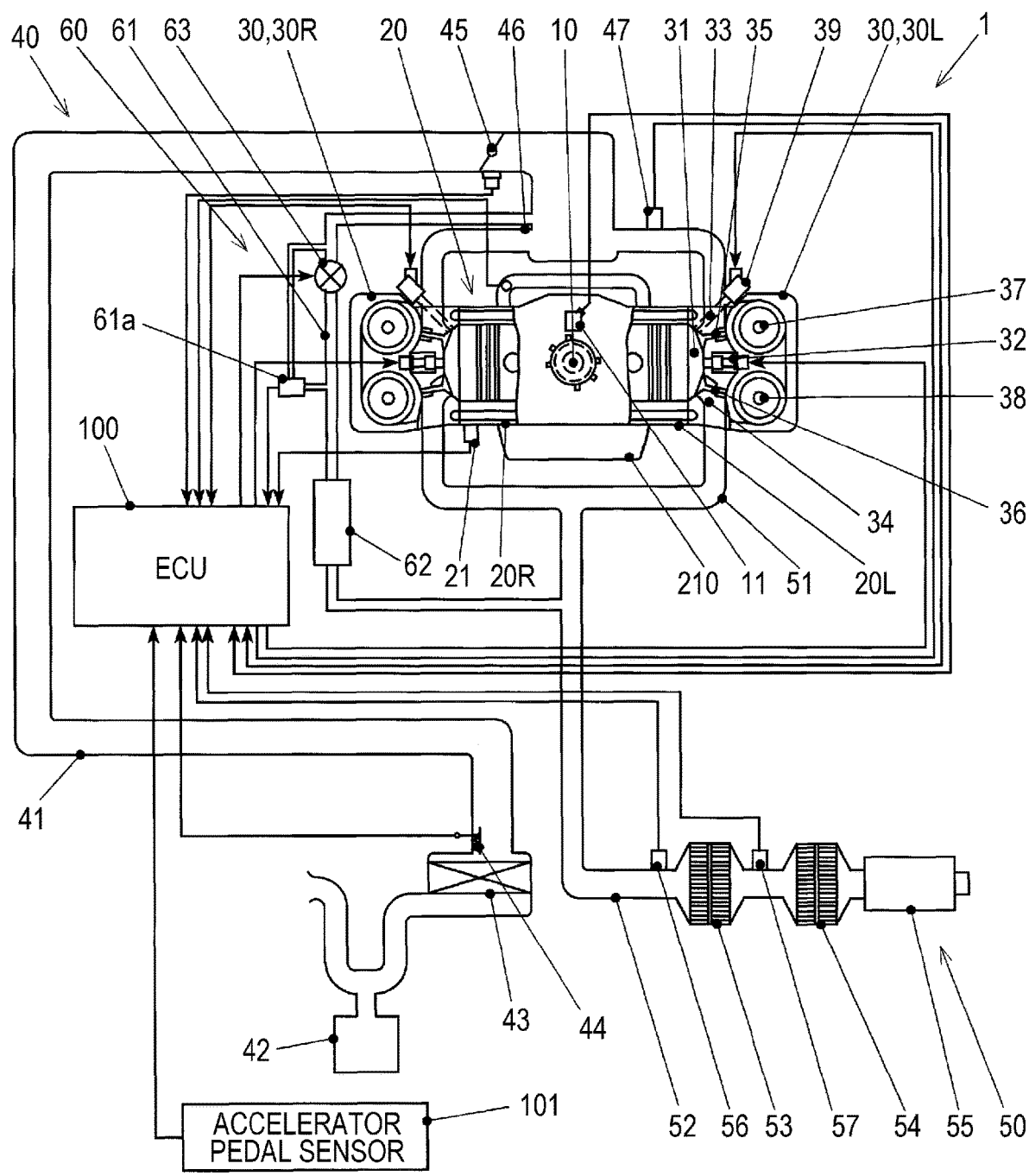
FIG. 1 is a diagram schematically illustrating a configuration of an engine having an EGR device according to an embodiment of the present disclosure.

FIG. 1 is a diagram schematically illustrating a configuration of an engine having the EGR device of the embodiment.

An engine 1 includes a crankshaft 10, a cylinder block 20 (20R and 20L), cylinder heads 30 (30R and 30L), an intake system 40, an exhaust system 50, an EGR device 60, an engine control unit (ECU) 100, and the like.

The crankshaft 10 is a rotation shaft to be an output shaft of the engine 1.

One end of the crankshaft 10 is coupled with a power transmission mechanism of a transmission gear or the like not illustrated in the drawings.

A crank pin disposed deviated from the rotation shaft is formed on the crankshaft 10.

The crank pin is coupled with a piston through a connecting rod not illustrated in the drawings.

A crank angle sensor 11 that detects an angular position of the crankshaft is provided to an end of the crankshaft 10.

An output of the crank angle sensor 11 is transmitted to the engine control unit 100.

The engine control unit 100 calculates an engine rotation number (crankshaft rotation speed) based on the output of the crank angle sensor 11.

The cylinder block 20 includes a right cylinder block 20R and a left cylinder block 20L which sandwich the crankshaft 10 from left and right directions when the crankshaft 10 is vertically mounted on a chassis.

A crank case is provided in a central area of the cylinder block 20.

The crank case is a space that houses the crankshaft 10. The crank case is provided with a main bearing that rotatably supports a journal of the crankshaft 10.

Inside of each of the right cylinder block 20R and the left cylinder block 20L that are disposed on the left and right with the crank case therebetween, for example, two cylinders (in the case of four-cylinder engine) in which pistons are inserted and reciprocated are formed.

The cylinder block 20 is provided with a knock sensor 21.

The knock sensor 21 has a piezoelectric element that generates an output voltage corresponding to vibration of the cylinder block 20.

The engine control unit 100 can detect the presence or absence of knocking based on a specific output waveform of the knock sensor 21 which is generated when knocking occurs.

The cylinder heads 30 (a right cylinder head 30R and a left cylinder head 30L) are respectively provided at ends (left and right ends) of the cylinder blocks 20 opposite to the crankshaft 10.

The cylinder head 30 includes a combustion chamber 31, a spark plug 32, an intake port 33, an exhaust port 34, an intake valve 35, an exhaust valve 36, an intake camshaft 37, an exhaust camshaft 38, an injector 39, and the like.

The combustion chamber 31 is formed by concaving a part of the cylinder head 30 facing a piston crown surface into, for example, a pent roof shape.

The spark plug 32 generates spark in response to an ignition signal from the engine control unit 100 and ignites an air-fuel mixture.

The spark plug 32 is provided at the center of the combustion chamber 31.

The intake port 33 is a flow path for introducing combustion air (fresh air) into the combustion chamber 31.

The exhaust port 34 is a flow path for exhausting burnt gas (exhaust gas) from the combustion chamber 31.

The intake valve 35 and the exhaust valve 36 open and close the intake port 33 and the exhaust port 34 at predetermined valve timings.

For example, two intake valves 35 and two exhaust valves 36 are provided to each cylinder.

The intake valve 35 and the exhaust valve 36 are opened and closed by the intake camshaft 37 and the exhaust camshaft 38 that rotate synchronously at a rotation number half of that of the crankshaft 10.

A cam sprocket of each of the intake camshaft 37 and the exhaust camshaft 38 is provided with a valve timing variable mechanism that changes valve opening timing and valve closing timing of each valve by advancing and delaying a phase of each camshaft.

The injector 39 forms an air-fuel mixture by injecting fuel into the combustion chamber 31 in response to a valve open signal issued from the engine control unit 100.

The injector 39 is provided so that a nozzle that injects fuel is exposed into a cylinder from a region of the intake port 33 on an inside surface of the combustion chamber 31.

The intake system 40 introduces air into the intake port 33.

The intake system 40 includes an intake duct 41, a chamber 42, an air cleaner 43, an air flow meter 44, a throttle valve 45, an intake manifold 46, an intake air pressure sensor 47, and the like.

The intake duct 41 is a flow path that introduces outside air into the intake port 33.

The chamber 42 is a space provided to communicate with a region close to inlet of the intake duct 41.

The air cleaner 43 filters air and removes dust and the like.

The air cleaner 43 is provided on the downstream side of a communication part between the intake duct 41 and the chamber 42.

The air flow meter 44 measures a flow rate of air passing through the intake duct 41.

The air flow meter 44 is provided close to outlet of the air cleaner 43.

An output of the air flow meter 44 is transmitted to the engine control unit 100.

The throttle valve 45 is a butterfly valve that controls output of the engine 1 by adjusting a flow rate of air.

The throttle valve 45 is provided close to a coupling part between the intake duct 41 and the intake manifold 46.

The throttle valve 45 is driven to open and close by an electric throttle actuator not illustrated in the drawings according to a target throttle opening that is set by the engine control unit 100 according to a driver request torque or the like.

The throttle valve 45 is provided with a throttle sensor that detects an opening degree of the throttle valve 45 and an output of the throttle sensor is transmitted to the engine control unit 100.

The intake manifold 46 is a branch pipe that distributes air to the intake ports 33 of the cylinders.

The intake manifold 46 is provided on the downstream side of the throttle valve 45.

The intake air pressure sensor 47 detects pressure (intake pressure) of air in the intake manifold 46.

An output of the intake air pressure sensor 47 is transmitted to the engine control unit 100.

The exhaust system 50 discharges exhaust gas discharged from the exhaust port 34 to the outside.

The exhaust system 50 includes an exhaust manifold 51, an exhaust pipe 52, a front catalyst 53, a rear catalyst 54, a silencer 55, an air-fuel ratio sensor 56, a rear O2 sensor 57, and the like.

The exhaust manifold 51 is a collection pipe that collects exhaust gases coming out from the exhaust ports 34 of the cylinders.

The exhaust pipe 52 is a pipeline that discharges exhaust gas coming out from the exhaust manifold 51 to the outside.

The front catalyst 53 and the rear catalyst 54 are provided in an intermediate portion of the exhaust pipe 52 and include a three-way catalyst that purifies HC, $NO_x$, CO, and the like in the exhaust gas.

The front catalyst 53 is provided adjacent to outlet of the exhaust manifold 51, and the rear catalyst 54 is provided on the outlet side of the front catalyst.

The silencer 55 reduces acoustic energy of the exhaust gas.

The silencer 55 is provided close to outlet of the exhaust pipe 52.

The air-fuel ratio sensor 56 is provided between the outlet of the exhaust manifold 51 and inlet of the front catalyst 53.

The rear O2 sensor 57 is provided between outlet of the front catalyst 53 and inlet of the rear catalyst 54.

The air-fuel ratio sensor 56 and the rear O2 sensor 57 both detect the amount of oxygen in the exhaust gas by generating an output voltage corresponding to an oxygen concentration in the exhaust gas.

The air-fuel ratio sensor 56 is a linear output sensor that can detect an oxygen concentration in a wider range of air-fuel ratio than the rear O2 sensor 57.

Outputs of the air-fuel ratio sensor 56 and the rear O2 sensor 57 are both transmitted to the engine control unit 100.

The EGR device 60 performs exhaust gas recirculation (EGR) in which a part of the exhaust gas is introduced from the exhaust manifold 51 into the intake manifold 46 as EGR gas.

The EGR device 60 includes an EGR flow path 61, an EGR cooler 62, an EGR valve 63, and the like.

The EGR flow path 61 is a pipeline that conveys the exhaust gas (EGR gas) from the exhaust manifold 51 to the intake manifold 46.

The EGR flow path 61 has a differential pressure sensor 61*a*.

The differential pressure sensor 61*a* detects a pressure difference (differential pressure) between the upstream side and the downstream side of the EGR valve 63 in the EGR flow path 61.

An output of the differential pressure sensor 61*a* is transmitted to the engine control unit 100.

The EGR cooler 62 cools exhaust gas flowing through the EGR flow path 61 by heat exchange with cooling water of the engine 1.

The EGR cooler 62 is provided in the midway of the EGR flow path 61.

The EGR valve 63 is a control valve that adjusts a flow rate of exhaust gas passing through the EGR flow path 61.

The EGR valve 63 is provided on the downstream side of the EGR cooler 62 in the EGR flow path 61.

An opening degree of the EGR valve 63 is controlled by the engine control unit 100 using an opening degree map set based on a predetermined target EGR rate (EGR gas flow rate/intake gas flow rate).

The configuration of the EGR valve 63 will be described later in detail.

The engine control unit (ECU) 100 integrally controls the engine 1 and its auxiliary machines.

The engine control unit 100 includes an information processor such as CPU, a memory such as RAM and ROM, an input/output interface, a bus that connects these components, and the like.

The engine control unit 100 is provided with an accelerator pedal sensor 101 that detects a stepping amount of an accelerator pedal (not illustrated in the drawings) stepped on by a driver.

The engine control unit 100 has a function to set a driver request torque based on an output of the accelerator pedal sensor 101 or the like.

The engine control unit 100 controls a throttle valve opening degree, a fuel injection amount, a fuel injection timing, an ignition timing, a valve timing, and the like so that a torque actually generated by the engine 1 approaches a set driver request torque.

The engine control unit 100 has a function to supply driving power of a predetermined drive frequency to a stepping motor 640 that drives the EGR valve 63 according to a driving condition of the engine 1 and the target EGR rate.

The stepping motor 640 is provided with driving power through a driver circuit (not illustrated in the drawings) that generates pulse-like power of a predetermined drive frequency in response to an instruction from the engine control unit 100.

In one embodiment, the engine control unit 100 may serve as a "motor driver", in cooperation with the driver circuit.

Figure 2:
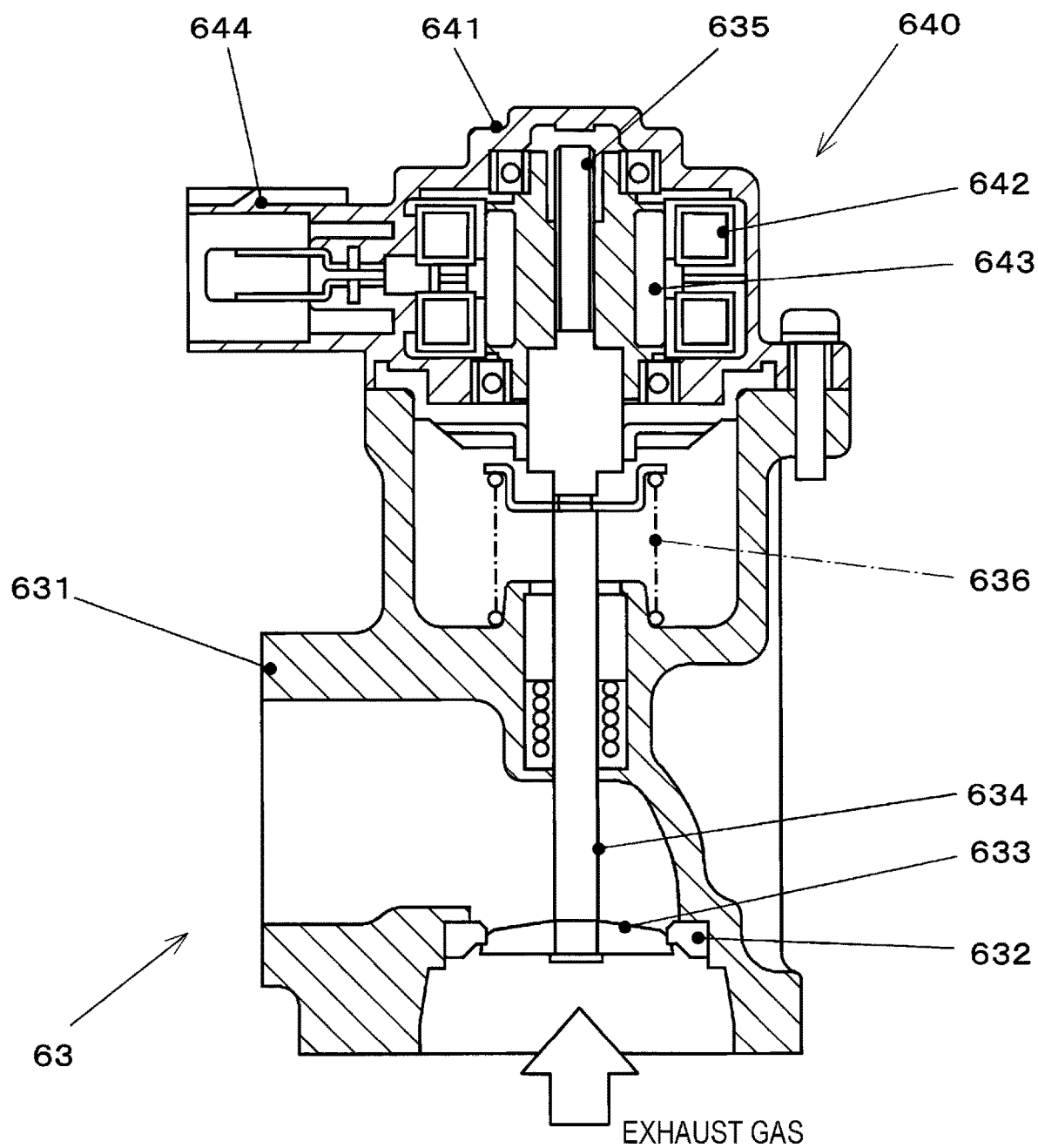
FIG. 2 is a diagram illustrating a configuration of an EGR valve of the EGR device of the embodiment.

FIG. 2 is a diagram illustrating a configuration of the EGR valve of the EGR device of the embodiment.

The EGR valve 63 includes a valve body 631, a valve sheet 632, a valve element 633, a valve stem 634, a screw 635, a return spring 636, the stepping motor 640, and the like.

The valve body 631 is a member that configures a main body of the EGR valve 63.

A flow path through which exhaust gas passes is formed inside the valve body 631.

The valve sheet 632 is an annular member which is provided in the flow path of the valve body 631 and comes into contact with an outer peripheral edge of the valve element 633 to close the flow path when the EGR valve 63 is opened.

The valve element 633 is a poppet valve having a main body formed into a disk shape (umbrella shape).

The valve element 633 can move along with the valve stem 634 over a predetermined stroke between a valve closed position where the outer peripheral edge is in close contact with the valve sheet 632 and a valve open position where the outer peripheral edge is separated from the valve sheet 632 and exhaust gas is passed through.

The valve stem 634 is a shaft-shaped part protruding from a central part of the valve element 633 toward the stepping motor 640.

The valve stem 634 is supported relatively displaceably in a shaft direction by the valve body 631.

An end of the valve stem 634 opposite to the valve element 633 is disposed to protrude from an exhaust flow path to the outside, and the screw 635 is formed near the end.

The screw 635 configures a lead screw mechanism, which drives the valve element 633 in an opening/closing direction, in cooperation with a nut formed on an inner diameter side of a rotor 643 of the stepping motor 640.

The valve element 633 is displaced relatively in a translation direction with respect to the valve body 631 along the shaft direction of the valve stem 634 and the screw 635 corresponding to rotation of the rotor 643 with respect to a stator 642.

The return spring 636 is a helical compression spring that urges the valve element 633 in a valve closing direction.

The return spring 636 has a function to close the EGR valve 63 when energization to the stepping motor 640 is stopped.

The stepping motor 640 includes a housing 641, the stator 642, the rotor 643, a connector 644, and the like.

The housing 641 is a case body that houses the stator 642, the rotor 643, and the like, and is attached to an end of the valve body 631 facing the screw 635.

The stator 642 has a plurality of coils annularly disposed along an inner circumferential surface of the housing 641.

The rotor 643 is a cylindrical member inserted on an inner diameter side of the stator 642 and is supported rotatably around a rotation axis concentric with the screw 635 with respect to the housing 641 by a bearing.

The rotor 643 has a magnetic body whose outer circumferential surface faces inner circumferential surfaces of the coils with a gap in between and which is alternately magnetized to an N-pole and an S-pole along a circumferential direction.

The stepping motor 640 is configured so that the rotor 643 is rotated by an angle corresponding to a predetermined number of instruction steps by applying electricity with predetermined drive frequency to the coils of the stator 642.

The connector 644 is a part which is provided to protrude from part of the housing 641 and to which wiring that supplies power to the coils of the stator 642 is coupled.

Hereinafter, an operation of the EGR device of the embodiment will be described.

The EGR device of the embodiment has a function to variably change the drive frequency of the stepping motor 640 by using a drive frequency map described below.

Figure 3:
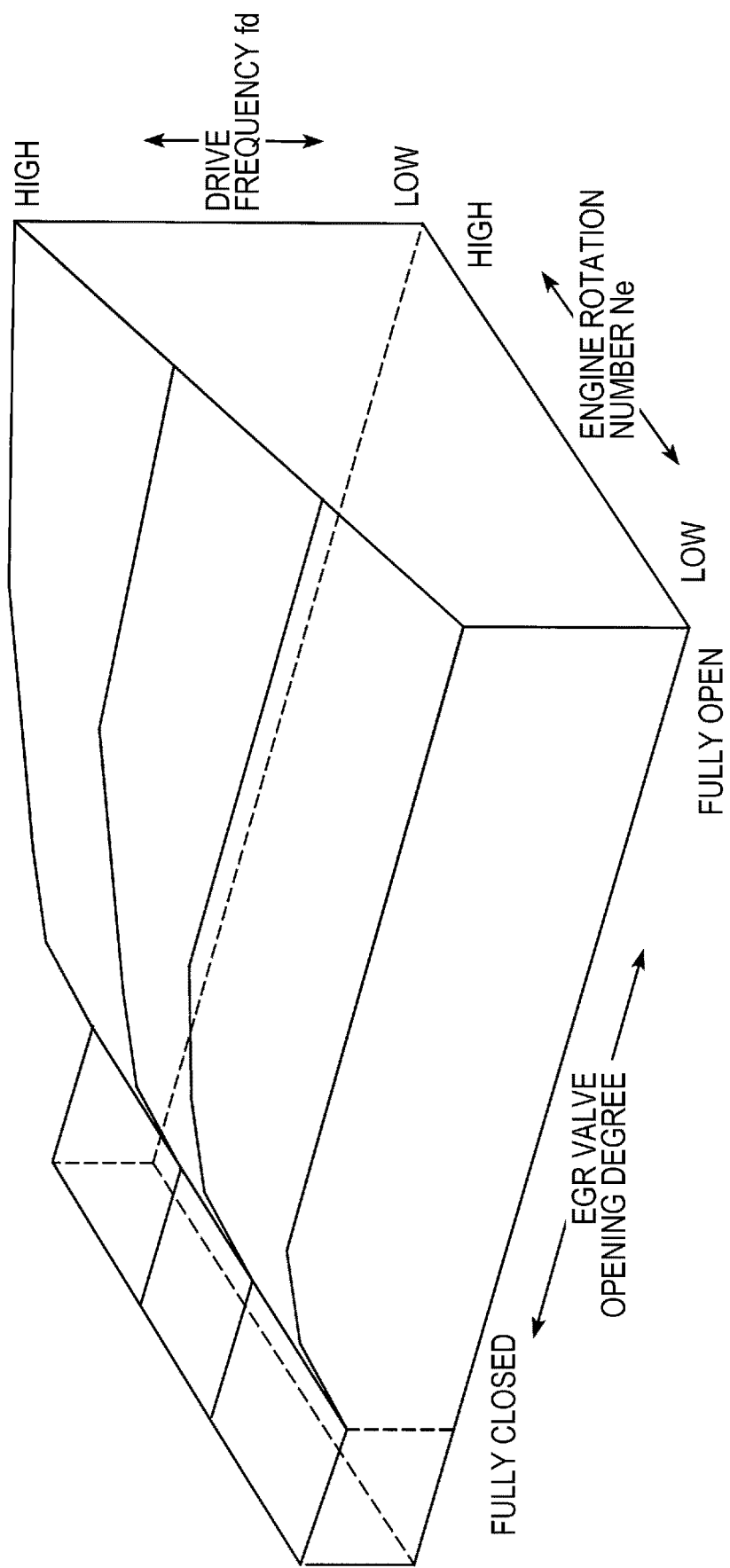
FIG. 3 is a schematic diagram illustrating an example of a drive frequency map in the EGR device of the embodiment.

FIG. 3 is a schematic diagram illustrating an example of the drive frequency map in the EGR device of the embodiment.

Figure 4:
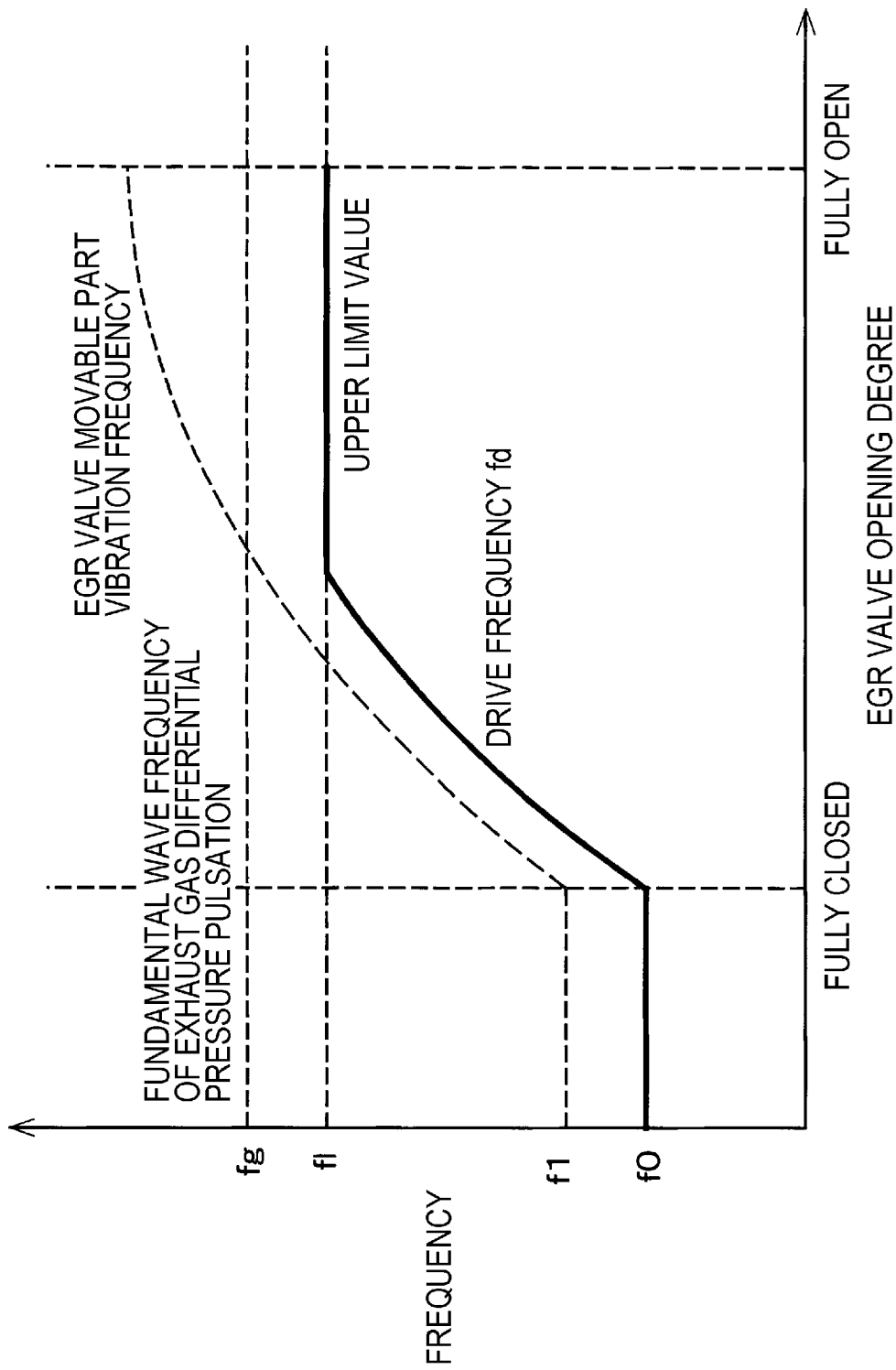
FIG. 4 is a diagram illustrating a relationship between an EGR valve opening degree and a drive frequency at a predetermined engine rotation number in the EGR device of the embodiment.

FIG. 4 is a diagram illustrating a relationship between an EGR valve opening degree and a drive frequency at a predetermined engine rotation number in the EGR device of the embodiment.

As illustrated in FIG. 3, the drive frequency map is configured so that a drive frequency fd to be applied is read according to a current opening degree (stroke) of the EGR valve 63 and an engine rotation number (output shaft rotation speed).

FIG. 4 is a diagram where a correlation between a valve opening degree and a drive frequency at a specific engine rotation number is derived from the drive frequency map illustrated in FIG. 3.

In FIG. 4, the horizontal axis represents the valve opening degree and the vertical axis represents the drive frequency.

In the embodiment, the drive frequency map is set so that the drive frequency fd avoids a vibration frequency (natural vibration frequency) of a movable part (the rotor 643, the valve element 633, and the like) of the EGR valve 63 and a frequency fg of a fundamental wave component of pressure pulsation of differential pressure between the front and rear of the EGR valve 63.

The vibration frequency of the EGR valve 63 depends on the mass of movable parts such as the rotor 643 and the like of the stepping motor 640, a differential pressure load of exhaust gas applied to the valve element 633, and a spring reaction force of the return spring 636.

For example, the differential pressure load applied to the valve element 633 tends to increase when the EGR valve 63 begins to be opened from a fully closed state and decrease thereafter as the opening degree increases.

Therefore, in a region near the fully closed state, the drive frequency fd is set to a frequency f0 lower than those in the other regions to secure torque of the stepping motor 640.

Here, when the drive frequency is set constant at such a low value (for example, the frequency f0), a driving speed of the EGR valve decreases, and responsiveness of EGR control is deteriorated.

Alternatively, when the drive frequency is set constant at a value higher than or equal to the vibration frequency of the fully closed EGR valve 63 (for example, the drive frequency is f1 when the EGR valve 63 is fully closed), if the drive frequency coincides with the vibration frequency, a sympathetic vibration of a movable portion of the EGR valve 63 occurs, so that there is a concern that a step-out of the stepping motor 640 occurs.

Therefore, in the present embodiment, it is set so that the drive frequency fd increases within a range shifted from the vibration frequency of the EGR valve 63 by a predetermined amount or more as the opening degree of the EGR valve 63 increases.

For example, in this region, the drive frequency fd may have a value that is offset downward from the vibration frequency of the movable part of the EGR valve 63 by a predetermined value.

A fundamental wave frequency of differential pressure pulsation between the front and rear of the EGR valve 63, which acts as an excitation force on the valve element 633, increases in proportion to a rotation number Ne of the engine 1 (rotation speed of the crankshaft 10).

The drive frequency map is set so that the drive frequency fd is shifted from the fundamental wave frequency of the differential pressure pulsation by a predetermined amount or more, and an upper limit value f1 in accordance with the engine rotation number is set to the drive frequency fd.

For example, the upper limit value f1 can be increased in proportion to a rise in the rotation number of the engine 1.

The drive frequency map described above can be generated by using, for example, an experiment using a real machine of the engine 1, a numerical value simulation result, or the like.

Figure 5:
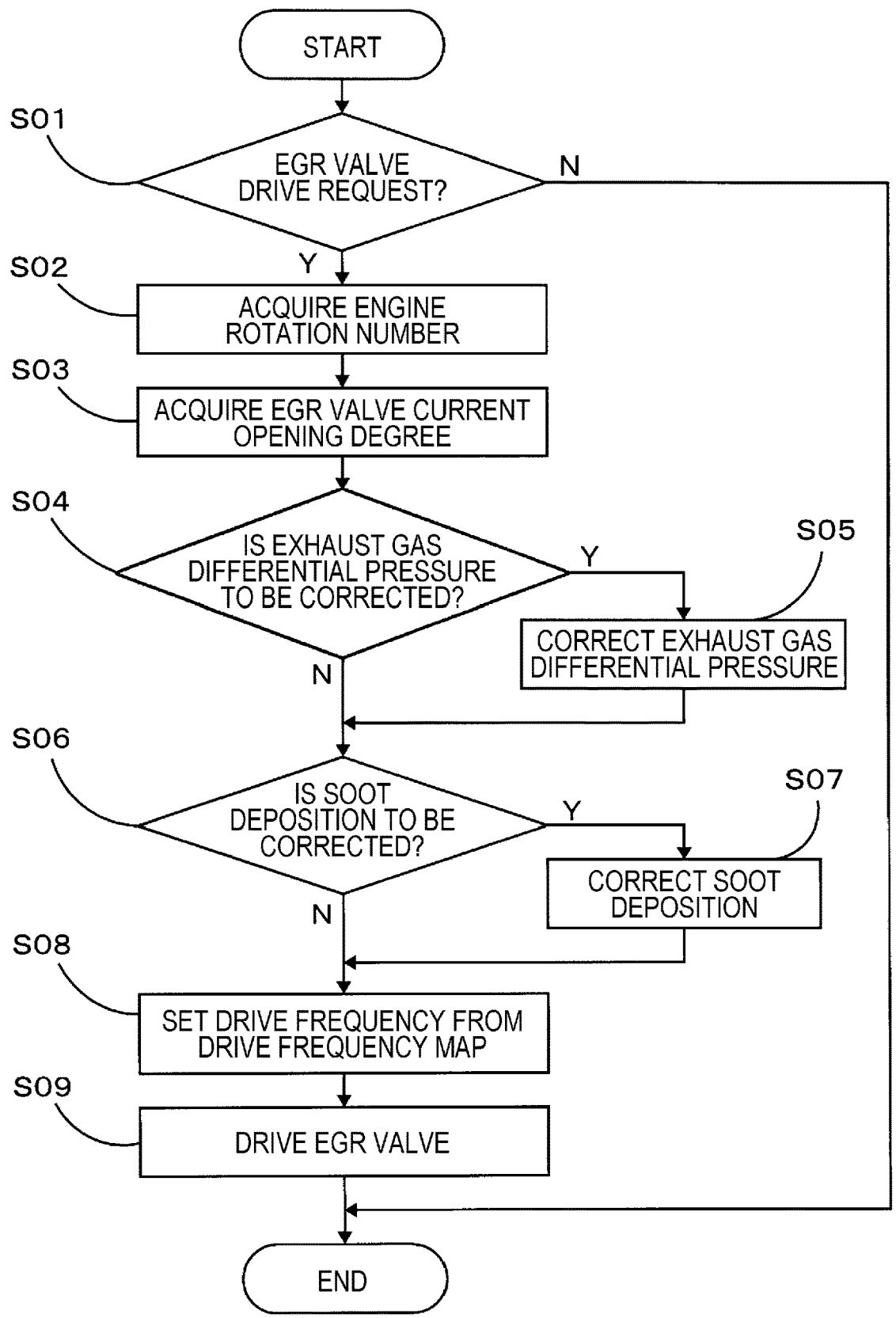
FIG. 5 is a flowchart illustrating an operation when the EGR valve is driven in the EGR device of the embodiment.

FIG. 5 is a flowchart illustrating an operation when the EGR valve is driven in the EGR device of the embodiment.

Hereinafter, each step will be described sequentially.

<Step S01: EGR Valve Drive Request Determination>

The engine control unit 100 determines whether there is a drive request for changing the opening degree of the EGR valve 63 in the EGR control.

When there is the drive request, the engine control unit 100 proceeds to step S02, and otherwise the engine control unit 100 ends (returns from) a series of processing.

<Step S02: Acquire Engine Rotation Number>

The engine control unit 100 acquires information related to the engine rotation number (the rotation speed of the crankshaft 10) based on an output of the crank angle sensor 11.

Thereafter, the engine control unit 100 proceeds to step S03.

<Step S03: Acquire EGR Valve Opening Degree>

The engine control unit 100 acquires information related to the current opening degree of the EGR valve 63 (the amount of displacement of the valve element 633 and the like).

It is possible to estimate the opening degree of the EGR valve 63 corresponding to the number of steps instructed from the engine control unit 100 (the number of steps can be replaced by a target opening degree in the EGR control) when no step-out occurs after performing zero point learning of the stepping motor 640 in the fully closed state.

In one embodiment, the engine control unit 100 may serve as an "opening degree estimator".

Thereafter, the engine control unit 100 proceeds to step S04.

<Step S04: Determine Whether Exhaust Gas Differential Pressure is to be Corrected>

The engine control unit 100 detects pulsation of differential pressure between the front and rear of the EGR valve 63 based on an output of the differential pressure sensor 61*a*.

For example, when there are individual differences (variations) of exhaust flow path lengths of the engine 1 among cylinders, a frequency distribution of excitation force applied to the valve element 633 by the differential pressure pulsation is broadened as the variation increases.

The engine control unit 100 proceeds to step S05 when the frequency distribution is broadened in the differential pressure pulsation detected by the differential pressure sensor 61*a*, and otherwise the engine control unit 100 proceeds to step S06.

<Step S05: Exhaust Gas Differential Pressure Correction>

When the frequency distribution is broadened in the differential pressure pulsation detected is step S04, the engine control unit 100 performs exhaust gas differential pressure correction that corrects downward the upper limit value fl in the drive frequency map in order to increase a margin for preventing sympathetic vibration of the EGR valve 63.

Thereafter, the engine control unit 100 proceeds to step S06.

<Step S06: Determine Whether Soot Deposition is to be Corrected>

The engine control unit 100 estimates a deposition amount of soot on the valve element 633 and the like based on a past operation state history of the engine 1 and the like.

The engine control unit 100 has a function as a soot deposition amount estimator of the present disclosure.

When the estimated soot deposition amount is greater than or equal to a predetermined threshold value, the engine control unit 100 proceeds to step S07, and otherwise proceeds to step S08.

<Step S07: Soot Deposition Correction>

The engine control unit 100 performs soot deposition correction that corrects downward the drive frequency fd in the drive frequency map according to increase of the soot deposition amount obtained in step S06.

Thereafter, the engine control unit 100 proceeds to step S08.

<Step S08: Set Drive Frequency from Drive Frequency Map>

The engine control unit 100 sets the drive frequency fd from the drive frequency map (a map after correction when the exhaust gas differential pressure correction and/or the soot deposition correction are performed) illustrated in FIG. 3 and the like by using the engine rotation number acquired in step S02 and the opening degree of the EGR valve 63 acquired in step S03.

Thereafter, the engine control unit 100 proceeds to step S09.

<Step S09: Drive EGR Valve>

The engine control unit 100 supplies driving power to the stepping motor 640 of the EGR valve 63 through the driver circuit by using the drive frequency fd set in step S08 and controls the stepping motor 640 so that the opening degree of the EGR valve 63 becomes a predetermined target opening degree.

Thereafter, the engine control unit 100 ends (returns from) the series of processing.

As described above, according to the present embodiment, the following effects can be obtained.

(1) It is possible to prevent the drive frequency fd of the stepping motor 640 from interfering with the frequency fg of the differential pressure pulsation of the exhaust gas and the vibration frequency of the EGR valve 63 by changing the drive frequency fd of the stepping motor 640 corresponding to changes of the engine rotation number and the EGR valve opening degree, so that it is possible to avoid sympathetic vibration and prevent step-out of the stepping motor 640.

Further, it is possible to increase the drive frequency fd within a range in which no step-out occurs, so that it is possible to increase the driving speed of the EGR valve 63.

(2) Even when soot is deposited on the EGR valve 63 and the weight of the EGR valve 63 is increased due to temporal change associated with operation of the engine 1 and the vibration frequency of the movable part of the EGR valve 63 is reduced, it is possible to reliably prevent the step-out of the stepping motor 640 by correcting a map value of the drive frequency fd according to the estimated soot deposition amount.

(3) By correcting the map value of the drive frequency fd of the stepping motor 640 according to the frequency distribution of the differential pressure pulsation detected by the differential pressure sensor 61*a*, even when the frequency distribution of the differential pressure pulsation changes due to variation of the exhaust flow path lengths of the cylinders or the like, it is possible to reliably obtain the effects described above by correcting the drive frequency fd so as not to correspond to an excitation frequency.

Modified Examples

The present disclosure is not limited to the embodiment described above, but can be variously modified and changed, and these modifications and changes are also within a technical scope of the present disclosure.

(1) The configuration of the EGR device and the engine in the embodiment is an example and can be appropriately changed.

For example, in the embodiment, the engine is a direct injection gasoline engine. However, the present disclosure is not limited to this and can be applied to an EGR device of other types of internal-combustion engine such as a port injection gasoline engine and a diesel engine.

Further, the number of cylinders of an engine, a cylinder layout, a valve drive method, the presence or absence of a supercharger, and the like are not particularly limited.

(2) In the embodiment, the drive frequency of the stepping motor is set to be lower than the vibration frequency of the EGR valve and the frequency of the differential pressure pulsation of the exhaust gas. However, when the stepping motor has a margin in drive torque, the drive frequency may be set to be higher than these frequencies.

(3) In the embodiment, the drive frequency of the stepping motor continuously changes. However, the drive frequency may be changed stepwise.

The frequency of the differential pressure pulsation of the exhaust gas which acts on the EGR valve as the excitation force increases in proportion to the output shaft rotation speed of the engine (so-called engine rotation number).

The vibration frequency of the EGR valve changes corresponding to changes of a reaction force of the return spring accompanying variation of the opening degree (the amount of displacement of the valve element) and the exhaust gas differential pressure acting on the valve element.

According to the present disclosure, it is possible to prevent the step-out of the stepping motor by setting so that the drive frequency of the stepping motor is shifted from the frequency of the differential pressure pulsation of the exhaust gas and the vibration frequency of the EGR valve by changing the drive frequency of the stepping motor according to variations of the output shaft rotation speed and the opening degree.

Further, it is possible to increase the drive frequency within a range in which no step-out occurs, so that it is possible to increase the driving speed of the EGR valve.

Furthermore, it is possible to more reliably prevent the step-out of the stepping motor by reliably preventing the sympathetic vibration of the movable part of the EGR valve.

Furthermore, even when soot, which is a particulate substance in the exhaust gas, is deposited on the EGR valve and the weight of the EGR valve is increased due to temporal change associated with operation of the engine and the vibration frequency of the EGR valve is reduced, it is possible to reliably prevent the step-out of the stepping motor.

Furthermore, even when the frequency distribution of the differential pressure pulsation changes due to, for example, variation of the exhaust flow path lengths of the cylinders or the like, it is possible to reliably obtain the effects described above by correcting the drive frequency so as not to interfere with an excitation frequency of the differential pressure pulsation.

As described above, according to the present disclosure, it is possible to provide an EGR device where the driving speed of the EGR valve is increased while preventing the step-out of the stepping motor.

The engine control unit 100 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the engine control unit 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the engine control unit 100 illustrated in FIG. 1.

The invention claimed is:

1. An exhaust gas recirculation (EGR) device comprising:
   an EGR flow path configured to convey exhaust gas from an exhaust flow path of an engine to an intake flow path;
   an EGR valve disposed on the EGR flow path;
   a stepping motor configured to drive the EGR valve to open and close;
   a motor driver configured to supply driving power to the stepping motor;
   a return spring configured to urge the EGR valve in a valve closing direction;
   a speed detector configured to detect an output shaft rotation speed of the engine; and
   an opening degree estimator configured to estimate an opening degree of the EGR valve,
   wherein the motor driver changes a drive frequency of the stepping motor according to variations of the output shaft rotation speed detected by the speed detector and the opening degree estimated by the opening degree estimator.

2. The EGR device according to claim 1, wherein
   the drive frequency is set within a range shifted from a vibration frequency of a movable part of the EGR valve by a predetermined amount or more.

3. The EGR device according to claim 1, further comprising:
   a soot deposition amount estimator configured to estimate an deposition amount of soot on the EGR valve,
   wherein the motor driver corrects the drive frequency in a lowering direction in accordance with increase of the soot deposition amount estimated by the soot deposition amount estimator.

4. The EGR device according to claim 2, further comprising:
   a soot deposition amount estimator configured to estimate an deposition amount of soot on the EGR valve,
   wherein the motor driver corrects the drive frequency in a lowering direction in accordance with increase of the soot deposition amount estimated by the soot deposition amount estimator.

5. The EGR device according to claim 1, further comprising:
   a differential pressure detector configured to detect a differential pressure between an upstream side and a downstream side of the EGR valve,
   wherein the motor driver corrects the drive frequency according to a frequency distribution of differential pressure pulsation detected by the differential pressure detector.

6. The EGR device according to claim 2, further comprising:
   a differential pressure detector configured to detect a differential pressure between an upstream side and a downstream side of the EGR valve,
   wherein the motor driver corrects the drive frequency according to a frequency distribution of differential pressure pulsation detected by the differential pressure detector.

7. The EGR device according to claim 3, further comprising:
   a differential pressure detector configured to detect a differential pressure between an upstream side and a downstream side of the EGR valve,
   wherein the motor driver corrects the drive frequency according to a frequency distribution of differential pressure pulsation detected by the differential pressure detector.

8. The EGR device according to claim 4, further comprising:
   a differential pressure detector configured to detect a differential pressure between an upstream side and a downstream side of the EGR valve, wherein the motor driver corrects the drive frequency according to a frequency distribution of differential pressure pulsation detected by the differential pressure detector.

9. An exhaust gas recirculation (EGR) device comprising:
an EGR flow path configured to convey exhaust gas from an exhaust flow path of an engine to an intake flow path;
an EGR valve disposed on the EGR flow path;
a stepping motor configured to drive the EGR valve to open and close;
a motor driver configured to supply driving power to the stepping motor;
a return spring configured to urge the EGR valve in a valve closing direction; and
circuitry configured to
   detect an output shaft rotation speed of the engine;
   estimate an opening degree of the EGR valve,
wherein the motor driver changes a drive frequency of the stepping motor according to variations of the detected output shaft rotation speed and the estimated opening degree.

* * * * *